United States Patent
D'Antuono

(10) Patent No.: US 12,365,039 B2
(45) Date of Patent: *Jul. 22, 2025

(54) HYDRAULIC TOOL

(71) Applicant: Milwaukee Electric Tool Corporation, Brookfield, WI (US)

(72) Inventor: Marc D'Antuono, Whitefish Bay, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/463,251

(22) Filed: Aug. 31, 2021

(65) Prior Publication Data

US 2021/0394287 A1 Dec. 23, 2021

Related U.S. Application Data

(63) Continuation of application No. 16/534,541, filed on Aug. 7, 2019, now Pat. No. 11,103,941.

(Continued)

(51) Int. Cl.
*B23D 29/00* (2006.01)
*B23D 27/04* (2006.01)
(Continued)

(52) U.S. Cl.
CPC .......... *B23D 29/002* (2013.01); *B23D 27/04* (2013.01); *B23D 35/002* (2013.01); *B25F 5/021* (2013.01)

(58) Field of Classification Search
CPC .... B23D 29/002; B23D 27/04; B23D 35/002; B25F 5/021
See application file for complete search history.

(56) References Cited

U.S. PATENT DOCUMENTS

| 2,421,414 | A |   | 6/1947 | Ernst |
| 4,026,028 | A | * | 5/1977 | Green ................... H02G 1/005 30/233 |

(Continued)

FOREIGN PATENT DOCUMENTS

| EP | 0 768 137 | 4/1997 |
| EP | 288 164 | 1/2014 |
| JP | S567620 | 1/1981 |

OTHER PUBLICATIONS

International Search Report and Written Opinion prepared by the European Patent Office in international patent application No. PCT/US2019/046329 dated Dec. 6, 2019.

*Primary Examiner* — Liang Dong
(74) *Attorney, Agent, or Firm* — Quarles & Brady LLP

(57) ABSTRACT

An example shearing head includes a first member and a second member being rotatable about a pin. The first member has a shearing surface forming a substantially right angle with a first lateral surface of the first member. The second member has a shearing surface forming a substantially right angle with a second lateral surface of the second member. The second member includes a first distal surface and a second distal surface forming a substantially right angle. The first distal surface and the second distal surface are substantially perpendicular to the second lateral surface. The second member includes a third lateral surface opposing the second lateral surface and a retainer is attached to the second member. A first surface of the retainer contacts the first distal surface, a second surface of the retainer contacts the second distal surface, and the third lateral surface contacts a third surface of the retainer.

18 Claims, 11 Drawing Sheets

Related U.S. Application Data

(60) Provisional application No. 62/726,013, filed on Aug. 31, 2018.

(51) Int. Cl.
   *B23D 35/00*   (2006.01)
   *B25F 5/02*   (2006.01)

(56) References Cited

U.S. PATENT DOCUMENTS

| | | |
|---|---|---|
| 9,381,622 B2 | 7/2016 | Wason |
| 11,426,806 B2 | 8/2022 | Wason |
| 2004/0181947 A1* | 9/2004 | Wagner .................. B23D 17/02 30/228 |
| 2008/0072436 A1 | 3/2008 | Frenken |
| 2014/0020528 A1* | 1/2014 | Wason .................... B23D 17/00 83/13 |
| 2016/0252112 A1* | 9/2016 | Kehoe ..................... B25B 7/126 60/327 |
| 2017/0165856 A1* | 6/2017 | Barezzani ............ B23D 29/002 |

* cited by examiner

HYDRAULIC TOOL

CROSS REFERENCE TO RELATED APPLICATIONS

The present application is a continuation of U.S. patent application Ser. No. 16/534,541, filed Aug. 7, 2019, which claims priority to U.S. Provisional Application No. 62/726,013 filed Aug. 31, 2018, the contents of which are hereby incorporated by reference in their entirety.

FIELD

The present disclosure relates generally to power tools. More particularly, the present disclosure relates to a handheld shearing power tool.

BACKGROUND

A hydraulic shearing tool can be used to shear a workpiece. For example, the hydraulic shearing tool may be used to snap a multi-stranded steel wire (between 3 and 19 strands wound together) into separate pieces. In such tools, a hydraulic pump is typically utilized for pressurizing hydraulic fluid and transferring it to a cylinder of the tool. This cylinder causes an extendible piston to be displaced towards a shearing head. The piston exerts a force on the shearing head, which typically includes opposed jaws with certain shearing features, depending upon the particular configuration of the tool. In this case, the force exerted by the piston can be used for closing the jaws to perform a shearing action on the work piece at a desired location.

Some shearing tools are configured to shear a particular type of metal wire having one or more layers comprising multiple soft metal strands (e.g., aluminum strands) that surround a hard metal core (e.g., steel). During use, the hard metal core will often resist shearing and exert forces against the jaws. These forces are transverse to the shearing plane of the tool. As such, these shearing tools often have a blade retainer installed on one of the jaws. The blade retainer resists movement of the jaws that is transverse to the shearing plane. Such blade retainers are typically sized and positioned to engage the opposing jaw after shearing of the soft metal sleeve has already been performed. Thus, if the tool is used to shear a similarly sized workpiece that includes a thicker hard metal core, the workpiece generally beings exerting the transverse forces before engagement of the blade retainer, causing the sheared edge to be crooked, or preventing the shearing operation from being completed at all.

Additionally, such blade retainers are typically fastened to a jaw with fasteners such as threaded bolts. If the tool is dropped by a user such that the blade retainer absorbs the impact, the threaded bolts can break due to the absorbed shear forces, and the blade retainer is no longer attached to the jaw.

Therefore, there is a need for a hydraulic shearing tool having a blade retainer that is attached to a jaw of the tool in a drop-resistant manner. There is also a need for a blade retainer that engages the opposing jaw of the shearing tool at an earlier stage of the shearing stroke.

SUMMARY

One aspect of the disclosure is a biased open shearing head for a hydraulic power tool, the shearing head comprising: a pin; a first jaw that is rotatable about the pin, the first jaw comprising: a first actuation member having a first cam surface, wherein the pin passes through the first actuation member, and wherein the first jaw is configured to rotate in response to a force being applied to the first cam surface; and a first shearing member having a first shearing surface that forms a first substantially right angle with a first lateral surface of the first shearing member, the first shearing member being attached to the first actuation member; a second jaw that is rotatable about the pin, the second jaw comprising: a second actuation member having a second cam surface, wherein the pin passes through the second actuation member, and wherein the second jaw is configured to rotate in response to a force being applied to the second cam surface; and a second shearing member having a second shearing surface that forms a substantially right angle with a second lateral surface of the second shearing member, the second shearing member being attached to the second actuation member, wherein the second shearing member includes a first distal surface and a second distal surface that form a substantially right angle, wherein the first distal surface and the second distal surface are substantially perpendicular to the second lateral surface, wherein the second shearing member includes a third lateral surface that is opposite the second lateral surface; an extension spring configured to resist (i) separation of the first cam surface and the second cam surface and (ii) movement of the first shearing surface toward the second shearing surface; and a blade retainer attached to the second shearing member, the blade retainer being configured, during a shearing action, to resist movement of the first shearing member or the second shearing member that is transverse to a shearing plane, wherein a first surface of the blade retainer fixedly contacts the first distal surface, a second surface of the blade retainer fixedly contacts the second distal surface, and the third lateral surface fixedly contacts a third surface of the blade retainer.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1A:
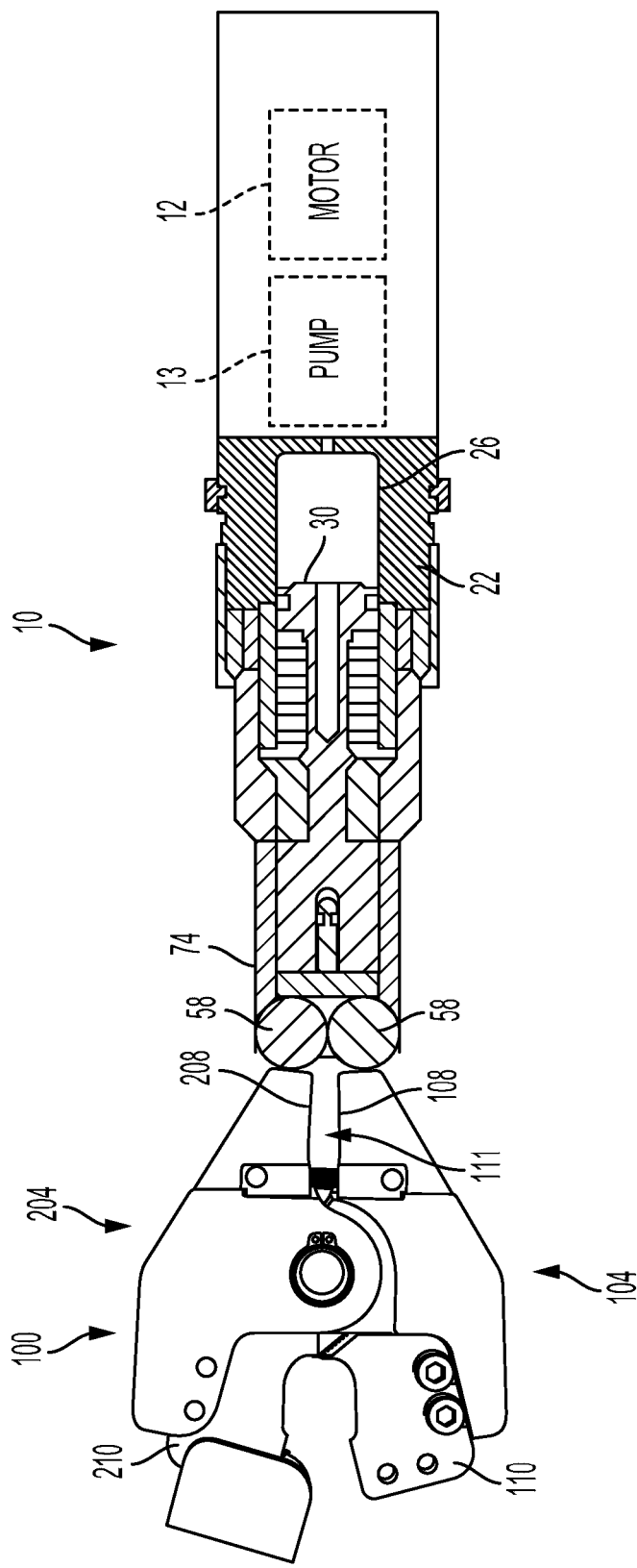
FIG. 1A is a schematic diagram of a hydraulic shearing tool, according to an example.

FIG. 1A illustrates a hydraulic power tool 10 that includes a biased open shearing head 100. The hydraulic power tool 10 includes a shearing head 100, an electric motor 12, a pump 13 driven by the motor 12, and a housing 22 defining a cylinder 26 therein. An extendable piston 30 is disposed within the cylinder 26. The pump 13 can provide pressurized hydraulic fluid to the cylinder 26, causing the piston 30 to extend from the housing 22 to thereby actuate a first jaw 104 and a second jaw 204 of the shearing head 100 for shearing a work piece, such as a guy wire (e.g, zinc-coated steel wire strand ASTM 475).

In operation, the piston 30 moves a set of rollers 58 towards the shearing head 100. (The rollers 58 are not to scale in FIG. 1A). As the set of rollers 58 begins to enter a cavity 111 defined by the first jaw 104 and the second jaw 204, the set of rollers 58 bear against a first cam surface 108 and a second cam surface 208. As the rollers 58 are inserted into the cavity 111, the first shearing member 110 of the first jaw 104 and the second shearing member 210 of the second jaw 204 close (e.g., rotate toward each other).

Figure 1B:
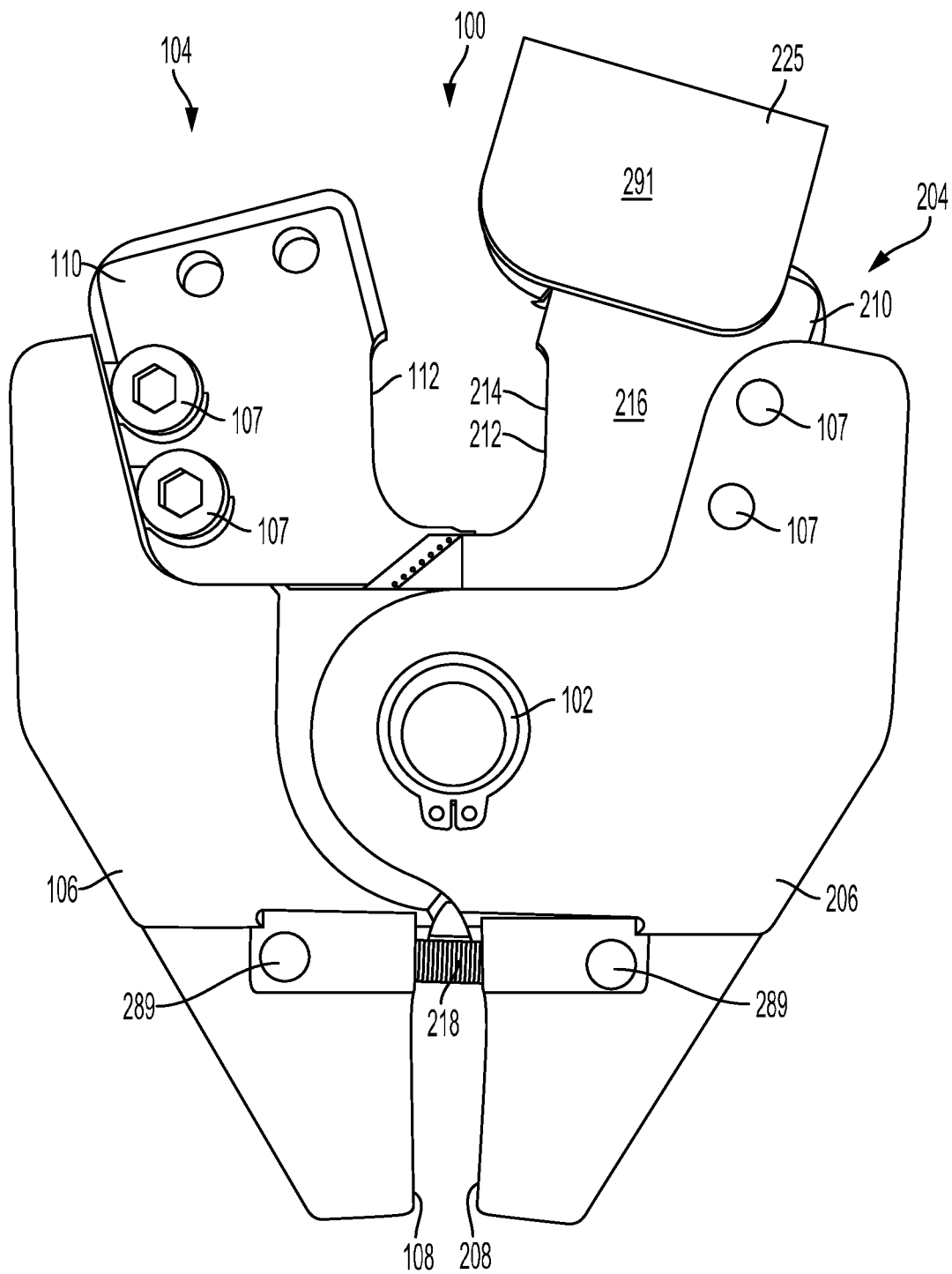
FIG. 1B is a front view of a shearing head, according to an example.

FIG. 1B is a front view of the shearing head 100. The shearing head 100 includes a pin 102 (e.g., a hollow metal tube) and the first jaw 104 (e.g., a metal jaw) that is rotatable about the pin 102. The first jaw 104 includes a first actuation member 106 (e.g., metal) having a first cam surface 108. The pin 102 passes through the first actuation member 106. The first jaw 104 is configured to rotate in response to a (leftward) force being applied to the first cam surface 108. The first jaw 104 also includes a first shearing member 110 (e.g., metal) having a first shearing surface 112 that forms a first substantially right angle 114 with a first lateral surface 116 of the first shearing member 110 (see FIG. 2). The first shearing member 110 is attached to the first actuation member 106 (e.g., threaded holes within the first actuation member 106) via fasteners 107 (e.g., threaded bolts) (see also FIG. 2), such that force applied to the first cam surface 108 is translated to the first shearing member 110.

The shearing head 100 also includes a second jaw 204 (e.g., metal jaw) that is rotatable about the pin 102. The second jaw 204 includes a second actuation member 206 (e.g., metal) having a second cam surface 208. The pin 102 passes through the second actuation member 206. The second jaw 204 is configured to rotate in response to a force being applied to the second cam surface 208. The second jaw 204 also includes a second shearing member 210 (e.g., metal) having a second shearing surface 212 that forms a second substantially right angle 214 with a second lateral surface 216 of the second shearing member 210. The second shearing member 210 is attached to the second actuation member 206 (e.g., threaded holes within the second actuation member 206) via fasteners 107 (e.g., threaded bolts), such that force applied to the second cam surface 208 is translated to the second shearing member 210.

Figure 8:
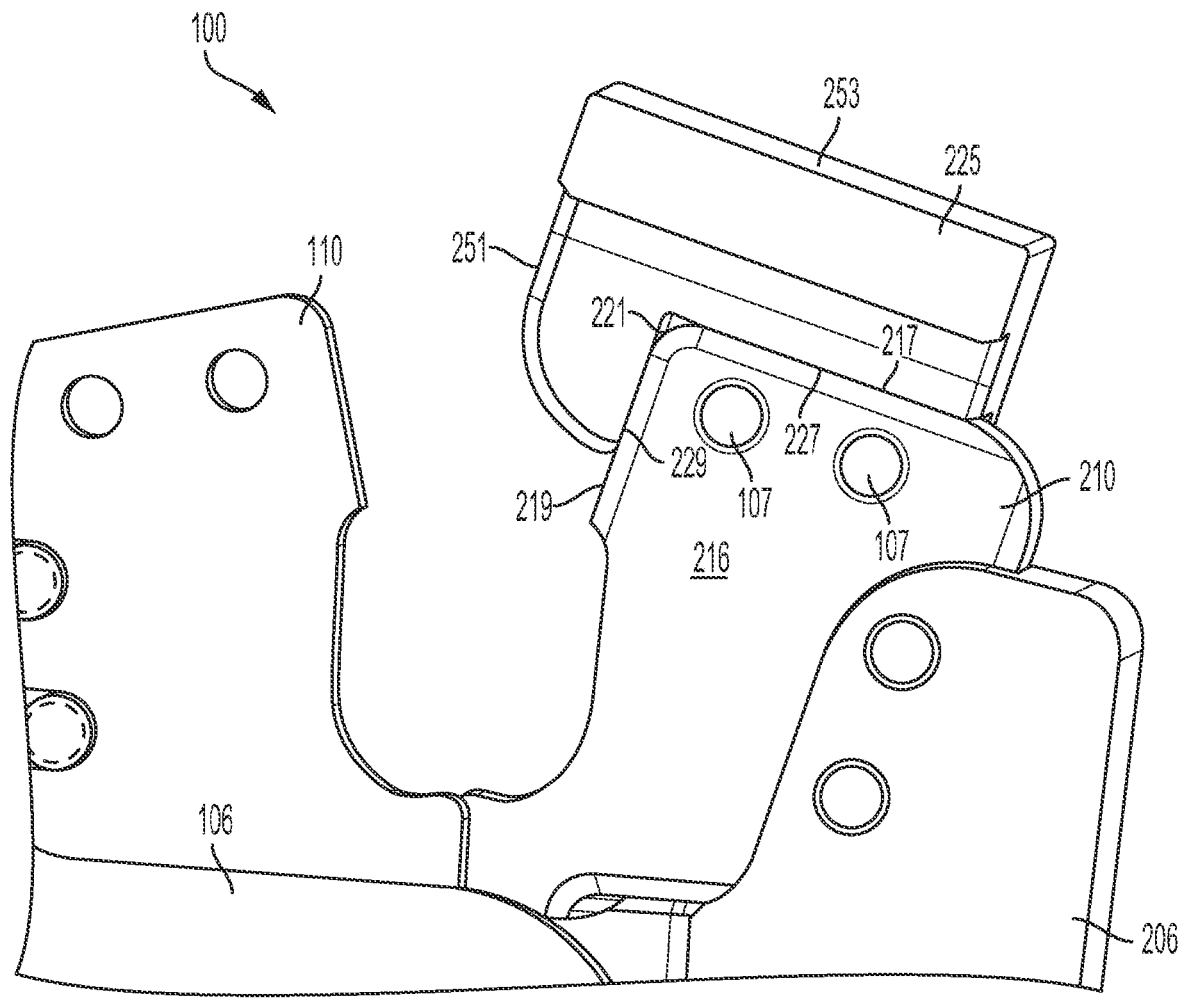
FIG. 8 is another sectioned view of a blade retainer, according to an example.

Referring to FIG. 8, the second shearing member 210 includes a first distal surface 217 and a second distal surface 219 that form a substantially right angle 221. In FIG. 8, a portion 291 (shown in FIG. 1B) of a blade retainer 225 (e.g., formed of metal) has been removed for clarity. The substantially right angle 221 can take the form of a gradual or rounded transition between the first distal surface 217 and the second distal surface 219 that are substantially perpendicular to each other. The first distal surface 217 and the second distal surface 219 are substantially perpendicular to the second lateral surface 216. The second shearing member 210 includes a third lateral surface 223 that is opposite the second lateral surface 216 (see FIGS. 2 and 6).

Referring to FIG. 1B, the shearing head 100 also includes an extension spring 218 configured to resist (i) separation of the first cam surface 108 and the second cam surface 208 and (ii) movement of the first shearing surface 112 toward the second shearing surface 212. The extension spring 218 can be fastened to the first actuation member 106 and to the second actuation member 206 respectively via fasteners 289.

Figure 2:
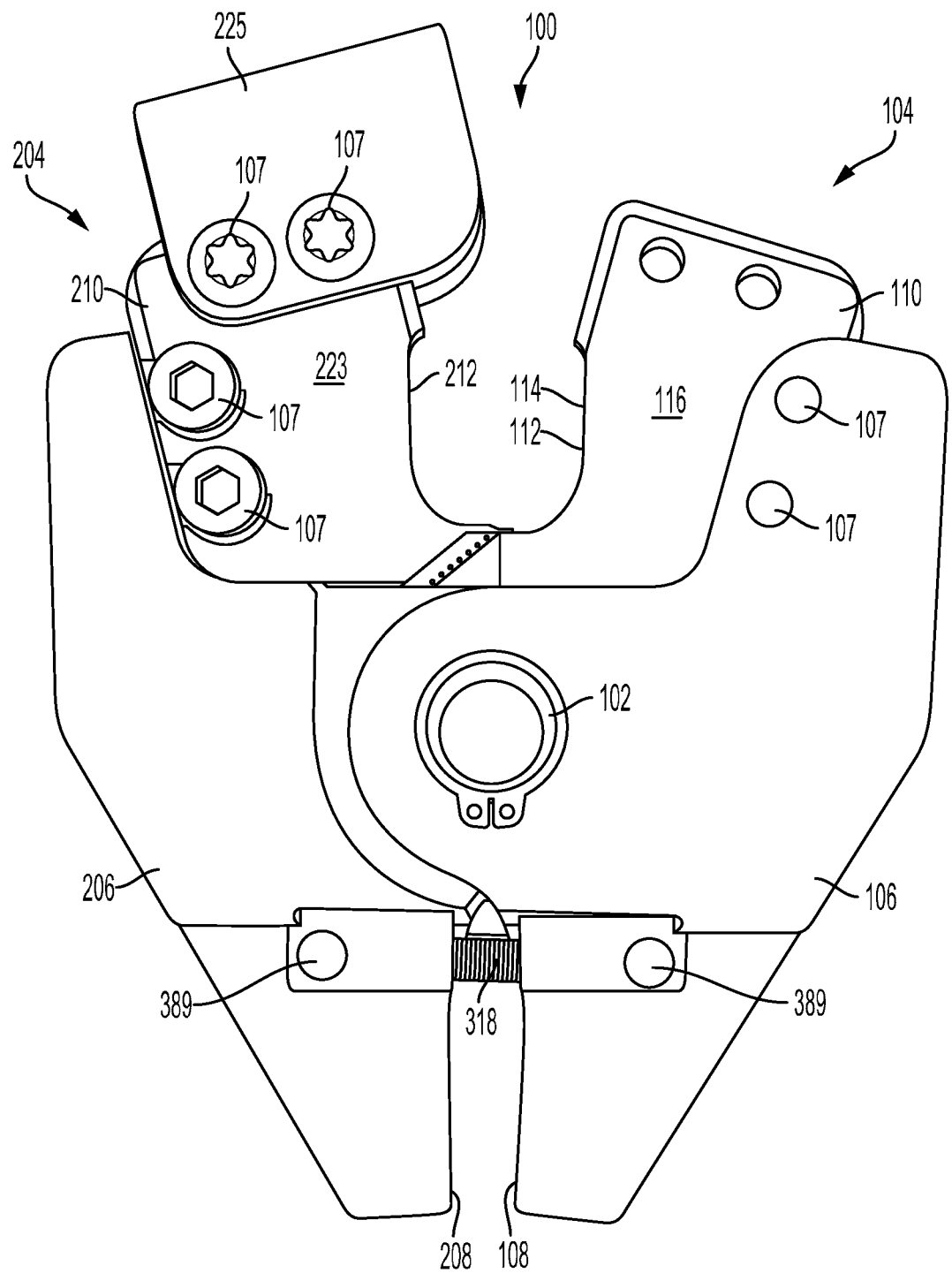
FIG. 2 is a rear view of a shearing head, according to an example.

Referring to FIG. 2, the shearing head 100 also includes an extension spring 318 configured to resist (i) separation of the first cam surface 108 and the second cam surface 208 and (ii) movement of the first shearing surface 112 toward the second shearing surface 212. The extension spring 318 can be fastened to the first actuation member 106 and to the second actuation member 206 respectively via fasteners 389.

Referring to FIG. 8, the shearing head 100 also includes the blade retainer 225 attached to the second shearing member 210 (e.g., via fasteners 107 and threaded holes within the second shearing member 210). The blade retainer 225 is configured, during a shearing action, to resist movement of the first shearing member 110 that is transverse to a shearing plane or movement of the second shearing member 210 that is transverse to the shearing plane. In FIG. 1B or FIG. 2, the shearing plane would be parallel to the paper.

Referring to FIG. 8, a first surface 227 of the blade retainer 225 fixedly contacts the first distal surface 217, a second surface 229 of the blade retainer 225 fixedly contacts the second distal surface 219, and the third lateral surface 223 of the second shearing member 210 (see FIG. 6) fixedly contacts a third surface 231 of the blade retainer 225. The blade retainer 225 can be attached to the second shearing member 210 via fasteners 107, for example. Typically, the first surface 227, the second surface 229, and the third surface 231 are orthogonal to each other.

As shown in FIG. 8, the blade retainer 225 advantageously extends beyond the second shearing member 210 in a direction parallel to the first distal surface 217 and in a direction parallel to the second distal surface 219. Thus, in the event a user drops the hydraulic power tool 10 such that a surface 251 or a surface 253 of the blade retainer 225 is impacted, the impact will be compressively absorbed by the second distal surface 219 and/or the first distal surface 217, thus preventing damage (e.g., breakage) to the fasteners 107 shown in FIG. 8.

Another advantage of the blade retainer 225 extending beyond the second shearing member 210 in the direction parallel to the first distal surface 217 is that the blade retainer 225 will engage the first shearing member 110 at an earlier stage of the shearing stroke than would otherwise be possible. This enables the shearing head 100 to shear wires or other workpieces having thicker diameters of hardened material (e.g., steel).

FIG. 2 is a rear view of the shearing head 100.

Figure 3:
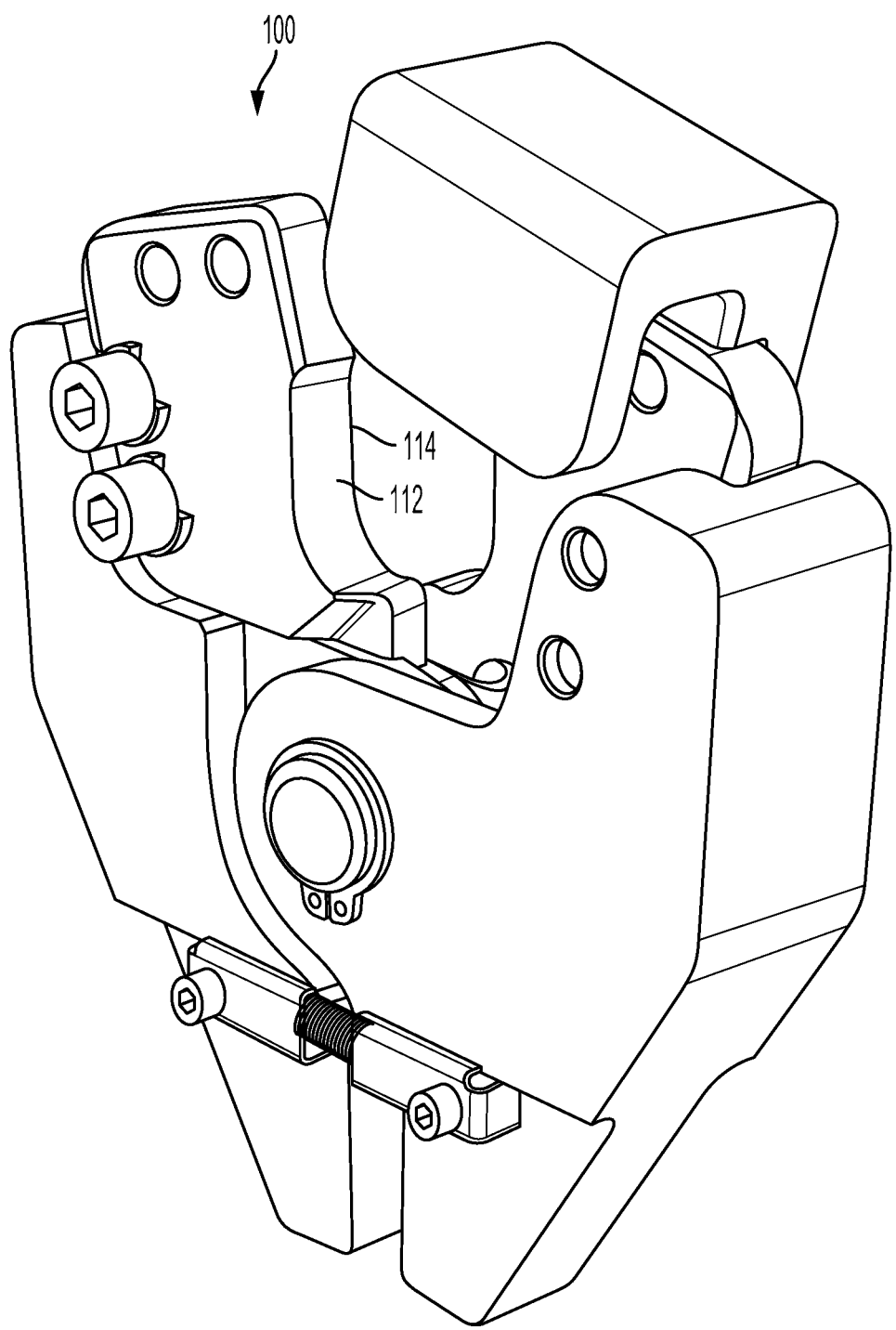
FIG. 3 is a perspective view of a shearing head, according to an example.

FIG. 3 is a perspective view of the shearing head 100. FIG. 3 shows the first shearing surface 112 and the first substantially right angle 114, among other features.

Figure 4:
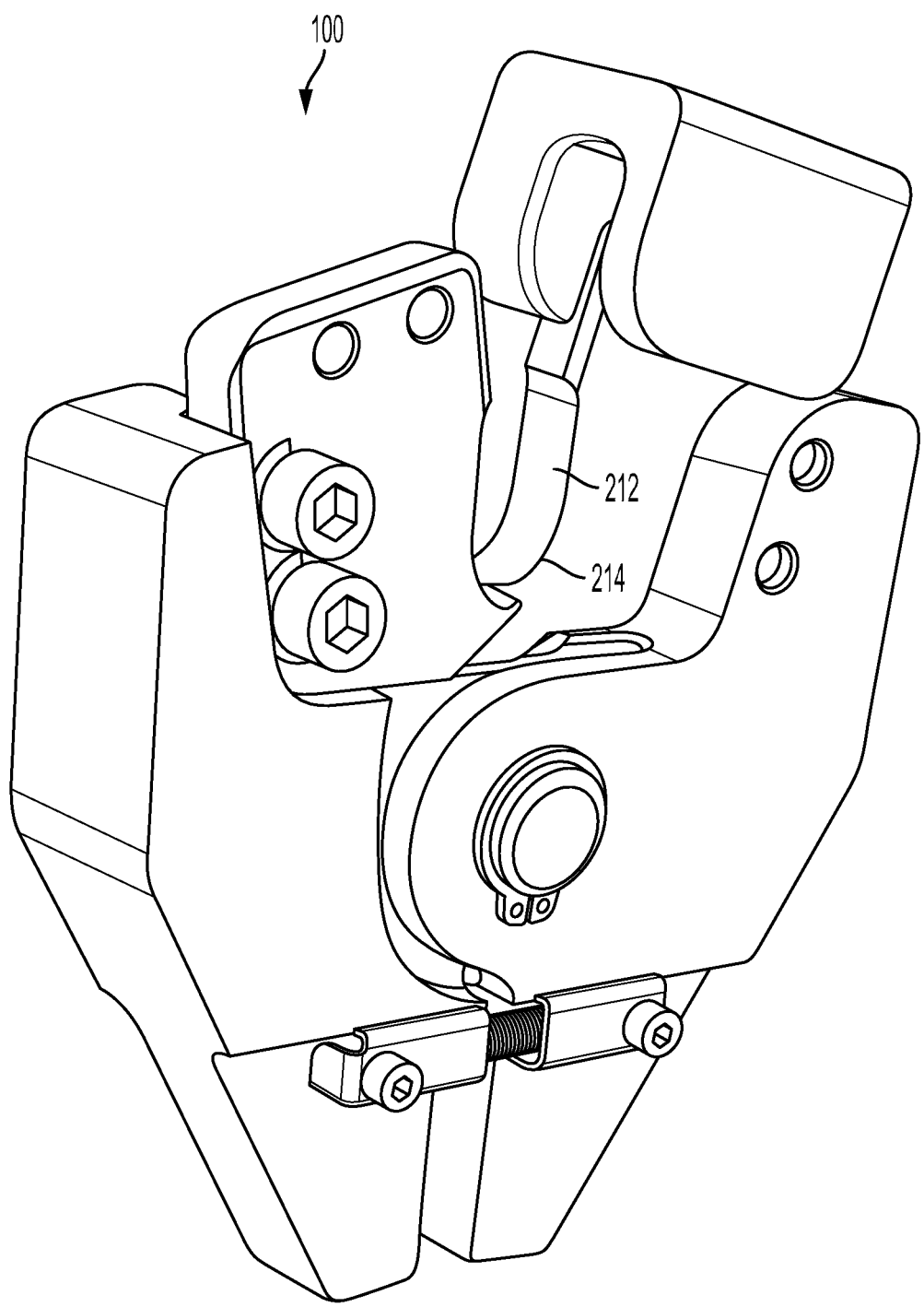
FIG. 4 is another perspective view of a shearing head, according to an example.

FIG. 4 is another perspective view of the shearing head 100. FIG. 4 shows the second shearing surface 212 and the second substantially right angle 214, among other features.

Figure 5:
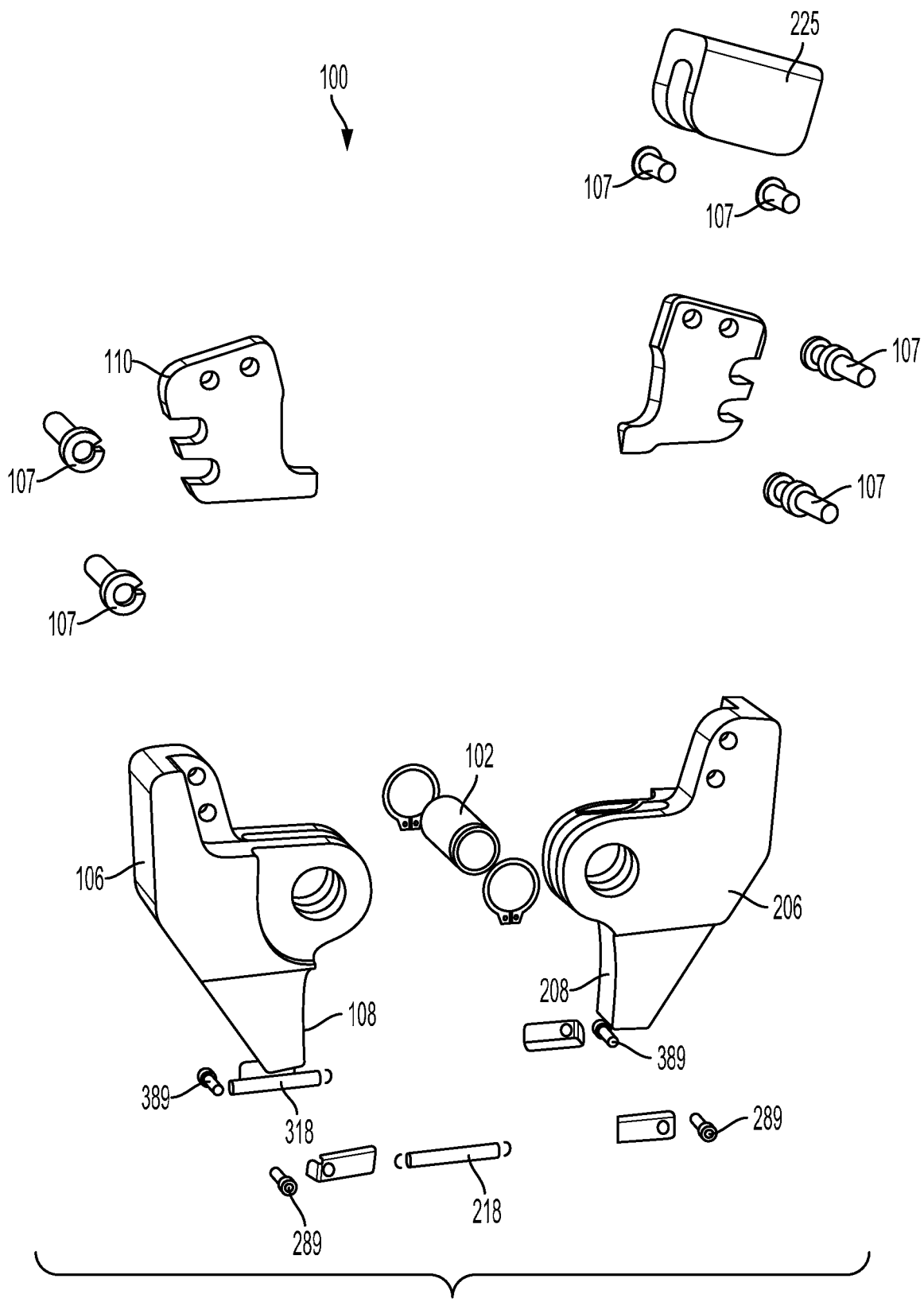
FIG. 5 is an exploded view of a shearing head, according to an example.

FIG. 5 is an exploded view of the shearing head 100.

Figure 6:
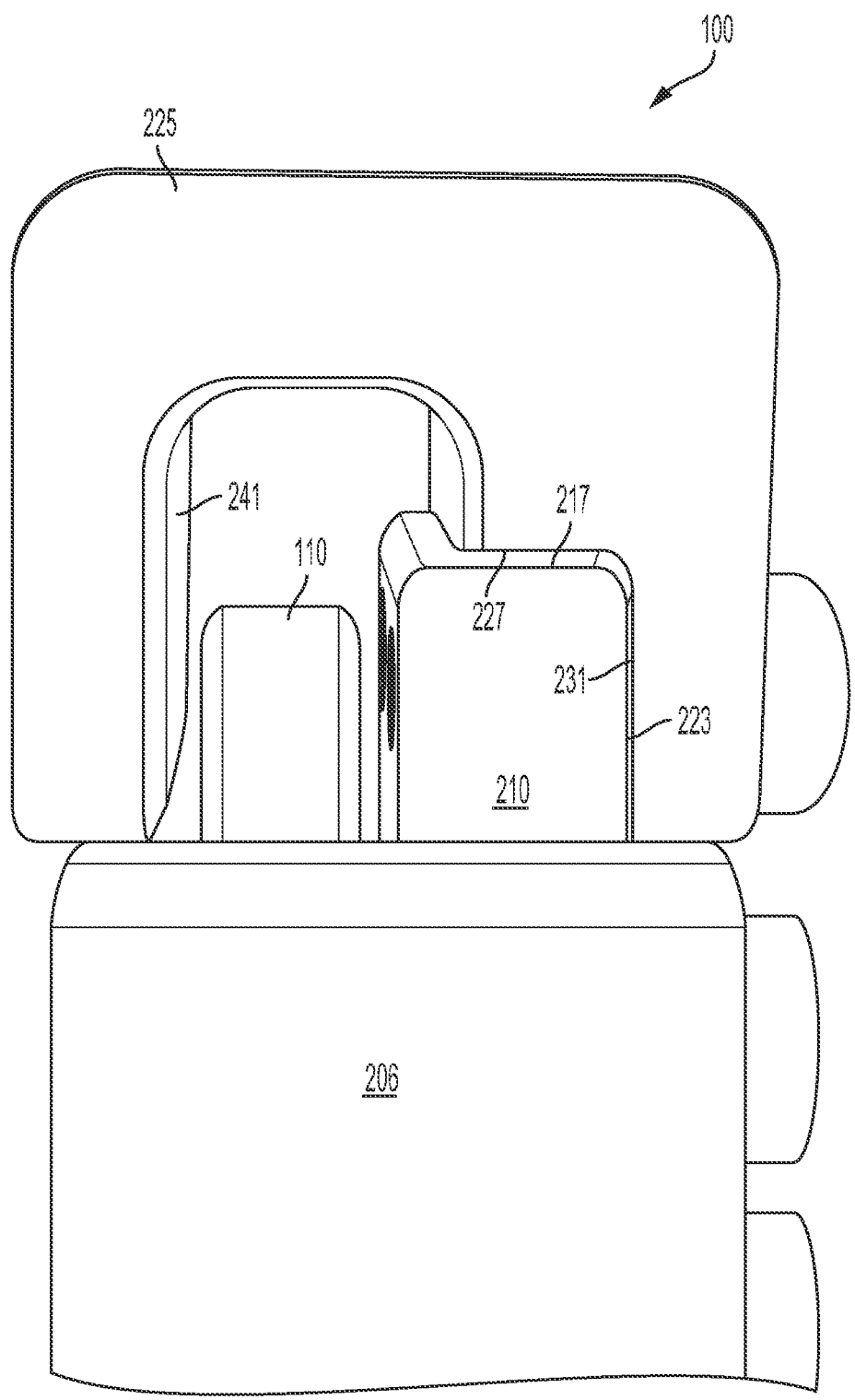
FIG. 6 is a close up view of a blade retainer, according to an example.

FIG. 6 is a close up view of the blade retainer 225. FIG. 6 shows how a surface 241 of the blade retainer 225 is configured to resist (leftward) motion of the first shearing member 110 that is normal to the shearing plane during a shearing operation. In FIG. 6, the shearing plane is vertically aligned with respect to the paper and extends into and out of the paper.

Figure 7:
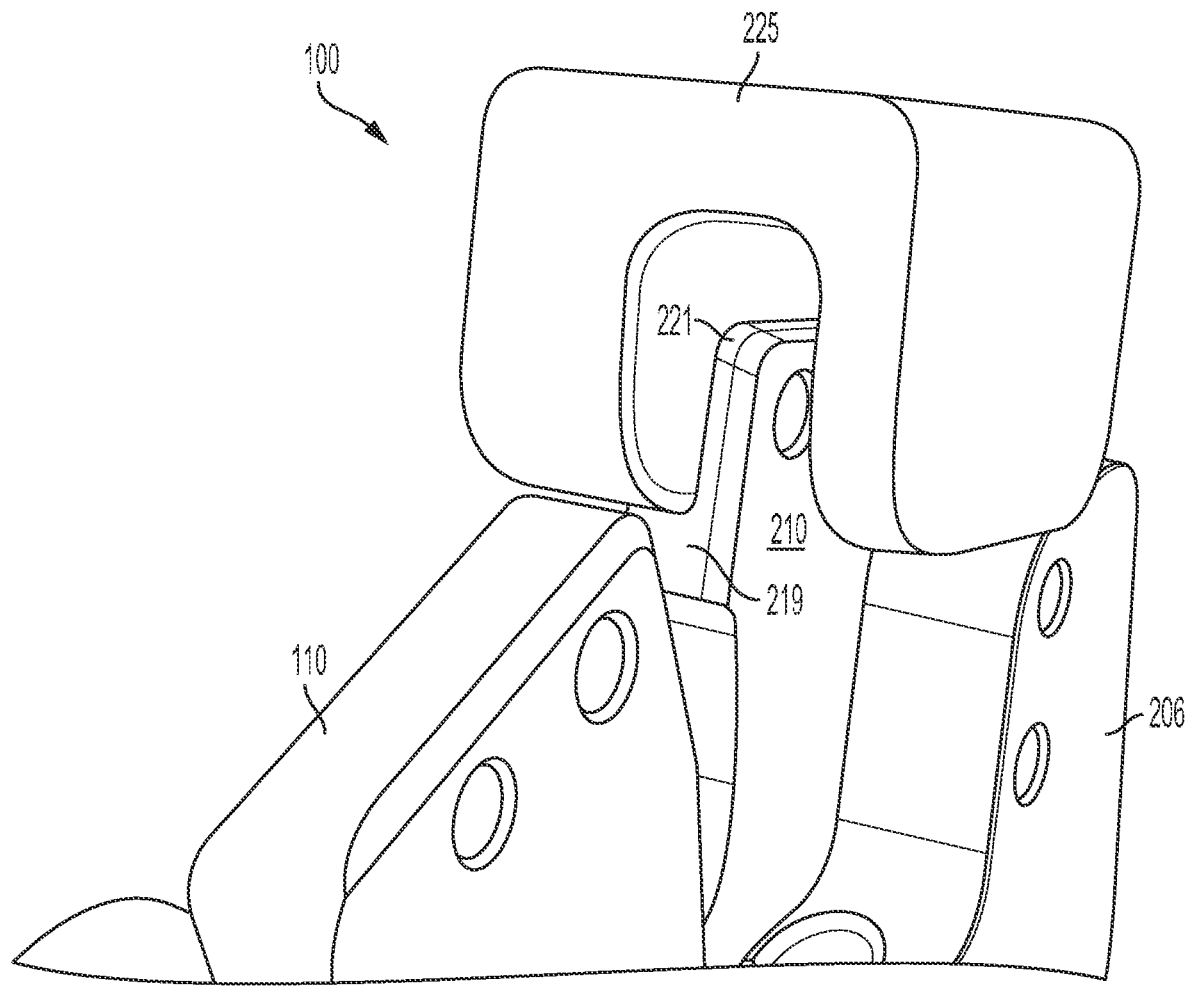
FIG. 7 is another close up view of a blade retainer, according to an example.

FIG. 7 is another close up view of the blade retainer 225.

FIG. 8 is another close up view of the blade retainer 225.

Figure 9:
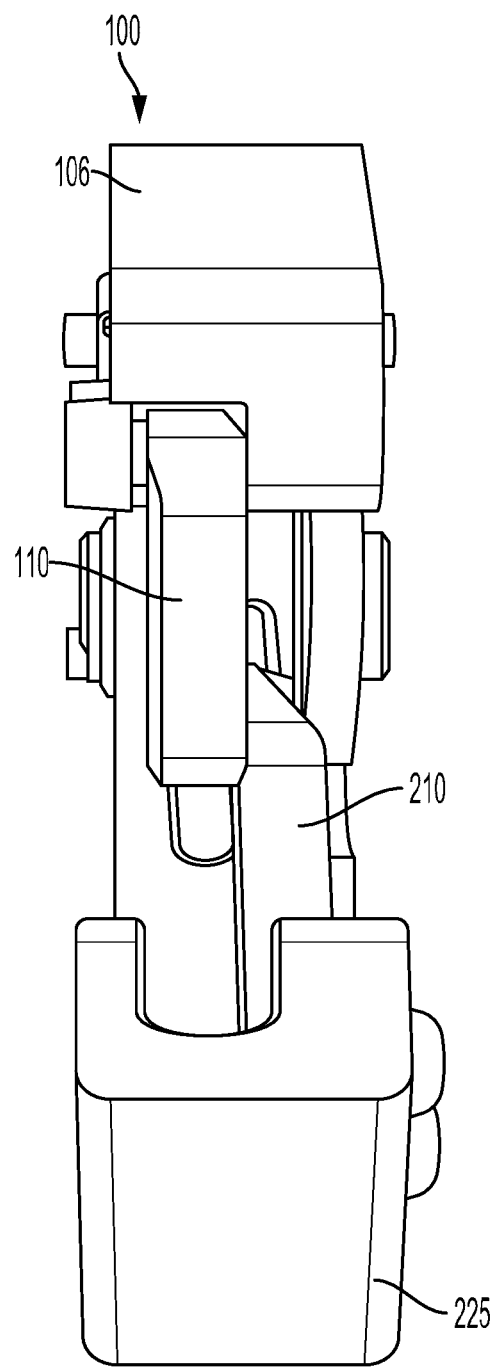
FIG. 9 is a top view of a shearing head, according to an example.

FIG. 9 is a top view of the shearing head 100.

Figure 10:
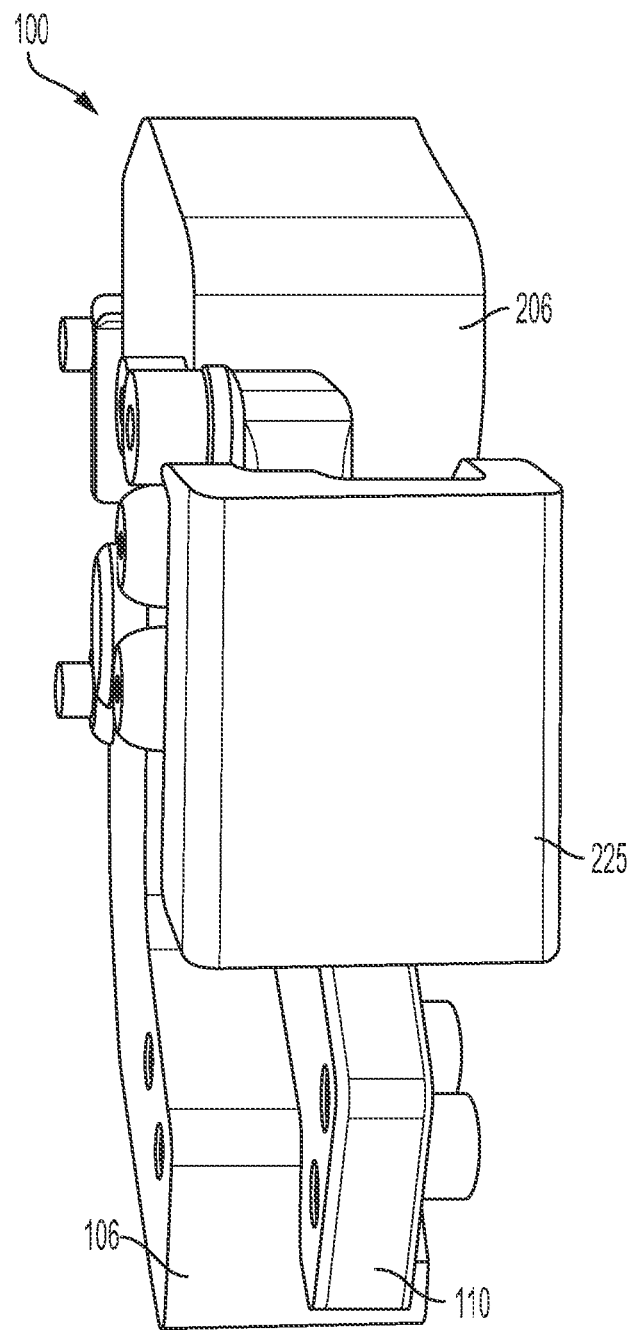
FIG. 10 is another top view of a shearing head, according to an example.

FIG. 10 is another top view of the shearing head 100.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A shearing head comprising:
a first jaw rotatable about a pivot axis and including a first shearing member, the first shearing member having a first shearing surface and a first lateral surface, the first shearing surface forming a right angle with the first lateral surface;
a second jaw rotatable about the pivot axis and including a second shearing member, the second shearing member having a second lateral surface, a second shearing surface, a first distal surface, and a second distal surface, the second distal surface facing the first shearing surface, and the second shearing surface forming a right angle with the second lateral surface; and
a blade retainer attached to the second jaw, the blade retainer in contact with the first distal surface, the second distal surface, and an outer lateral surface of the second jaw, the blade retainer resisting movement of the first jaw that is transverse to a shearing plane during a cutting action and the blade retainer distributing an impact force applied to the blade retainer to the first distal surface and the second distal surface of the second jaw so that the impact force is compressively absorbed by the first distal surface and the second distal surface of the second jaw.

2. The shearing head of claim 1, wherein the first distal surface is perpendicular to the second distal surface.

3. The shearing head of claim 2, wherein the outer lateral surface is perpendicular to the second distal surface.

4. The shearing head of claim 3, wherein the blade retainer includes a first lateral leg in contact with the outer lateral surface of the second jaw and a second lateral leg that contacts an outer lateral surface of the first jaw.

5. The shearing head of claim 4, wherein the first lateral leg and the second lateral leg define a channel through the blade retainer.

6. The shearing head of claim 1, wherein the blade retainer includes:
a first surface in contact with the first distal surface of the second jaw;
a second surface in contact with the second distal surface of the second jaw; and
a third surface in contact with the outer lateral surface of the second jaw,
wherein the first surface, the second surface, and the third surface of the blade retainer are orthogonal.

7. The shearing head of claim 6, wherein movement of the first shearing surface toward the second shearing surface is configured to shear a work piece into two pieces.

8. The shearing head of claim 1, wherein the first jaw and the second jaw are rotatable about the pivot axis between an open position and a closed position, and
wherein the first jaw contacts the blade retainer before the closed position.

9. The shearing head of claim 1, wherein the blade retainer extends beyond the second jaw in a direction parallel to the first distal surface of the second jaw and in a direction parallel to the second distal surface of the second jaw.

10. A shearing head for a hydraulic power tool, the shearing head comprising:
a first jaw having a first cam surface and rotatable about a pivot axis and including a first shearing member, the first shearing member having a first shearing surface and a first lateral surface, the first shearing surface forming a right angle with the first lateral surface;
a second jaw having a second cam surface and rotatable about the pivot axis and including a second shearing member, the second shearing member having a second lateral surface, a second shearing surface, a first distal surface, and a vertical distal surface, the vertical distal surface facing the first shearing surface, and the second shearing surface forming a right angle with the second lateral surface;
an extension spring secured to the first jaw and the second jaw, the extension spring resisting separation of the first cam surface and the second cam surface, the extension spring resisting movement of the first shearing surface toward the second shearing surface; and
a blade retainer attached to the second jaw, the blade retainer resisting movement of the first jaw or the second jaw that is transverse to a shearing blade during a shearing action, the blade retainer including:
a first surface in contact with the vertical distal surface of the second shearing member, and
a second surface in contact with the second lateral surface of the second jaw.

11. The shearing head of claim 10, wherein the blade retainer includes a third surface that contacts the lateral surface of the first jaw.

12. The shearing head of claim 11, wherein the blade retainer includes a fourth surface in contact with the first distal surface of the second jaw, the first distal surface perpendicular to the vertical distal surface.

13. The shearing head of claim 12, wherein the blade retainer defines a channel and each of the first surface, the second surface, the third surface, and the fourth surface of the blade retainer are disposed within the channel; and
wherein the channel extends past the vertical distal surface of the second jaw in a direction parallel to the first distal surface.

14. The shearing head of claim 10, wherein the first jaw engages the blade retainer before the first jaw and the second jaw being positioned to both exert force upon a work piece between the first jaw and the second jaw.

15. The shearing head of claim 10, wherein the second lateral surface of the second jaw includes a first fastener hole and the blade retainer includes a second fastener hole extending through the second surface, and
wherein the first fastener hole and the second fastener hole are aligned to receive a fastener to secure the blade retainer to the second jaw.

16. The shearing head of claim 10, wherein the blade retainer is formed from metal.

17. A method of using a shearing head, the method comprising:
placing a work piece in a shearing zone between a first jaw and a second jaw of the shearing head;
rotating, along a single pivot axis, the first jaw toward the second jaw to extend an extension spring arranged to bias the first jaw and the second jaw toward an open position;
engaging the first jaw with a blade retainer secured to the second jaw, the blade retainer in contact with a lateral surface, a first distal surface, and a second distal surface of the second jaw, the second distal surface facing the shearing zone; and
shearing the work piece into two pieces.

18. The method of claim 17, wherein engaging the first jaw with the blade retainer includes the blade retainer receiving the first jaw within a channel, the channel including a first surface, a second surface, and a third surface in contact with the second jaw, the blade retainer configured to resist movement of the first jaw or the second jaw that is transverse to a shearing blade during.

* * * * *